US012009597B2

(12) United States Patent
Zólomy et al.

(10) Patent No.: US 12,009,597 B2
(45) Date of Patent: Jun. 11, 2024

(54) METAMATERIAL ANTENNA ARRAY WITH ISOLATED ANTENNAS AND GROUND SKIRT ALONG THE PERIMETER

(71) Applicant: Silicon Laboratories Inc., Austin, TX (US)

(72) Inventors: Attila Zólomy, Budapest (HU); Ádám Süle, Budapest (HU); Daniel Simon, Budapest (HU); Kiruba Sankaran Subramani, Austin, TX (US); Terry Lee Dickey, Pflugerville, TX (US); Jeffrey Tindle, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 210 days.

(21) Appl. No.: 17/830,536

(22) Filed: Jun. 2, 2022

(65) Prior Publication Data

US 2022/0416439 A1 Dec. 29, 2022

Related U.S. Application Data

(63) Continuation-in-part of application No. 17/356,853, filed on Jun. 24, 2021, now Pat. No. 11,611,152.

(51) Int. Cl.

*H01Q 21/06* (2006.01)
*H01Q 9/04* (2006.01)
*H01Q 15/00* (2006.01)

(52) U.S. Cl.

CPC .......... *H01Q 21/065* (2013.01); *H01Q 9/045* (2013.01); *H01Q 15/0086* (2013.01)

(58) Field of Classification Search

CPC H01Q 15/00; H01Q 1/38; H01Q 9/04; H01Q 21/065

See application file for complete search history.

(56) References Cited

U.S. PATENT DOCUMENTS 7,463,213 B2 12/2008 Nakano et al.
8,395,552 B2 3/2013 Geiler et al.
(Continued)

FOREIGN PATENT DOCUMENTS

EP 1425817 B1 7/2009

OTHER PUBLICATIONS

Notice of Allowance mailed Jan. 18, 2024 in co-pending U.S. Appl. No. 17/846,594.

(Continued)

*Primary Examiner* — Hasan Islam
(74) *Attorney, Agent, or Firm* — NIELDS, LEMACK & FRAME, LLC

(57) ABSTRACT

An antenna array that utilizes ground guard rings and metamaterial structures is disclosed. In certain embodiments, the antenna array is constructed from a plurality of antenna unit cells, wherein each antenna unit cell is identical. The antenna unit cell comprises a top surface, that contains a patch antenna and a ground guard ring. A reactive impedance surface (RIS) layer is disposed beneath the top surface and contains the metamaterial structures. The metamaterial structures are configured to present an inductance to the patch antennas, thereby allowing the patch antennas to be smaller than would otherwise be possible. In some embodiments, the metamaterial structures comprise hollow square frames. An antenna array constructed using this antenna unit cell has less coupling than conventional antenna arrays, which results in better performance. A ground skirt surrounds the perimeter of the antenna array to improve radiation phase pattern balance within the array.

16 Claims, 13 Drawing Sheets

(56) References Cited

U.S. PATENT DOCUMENTS

| | | | | |
|---|---|---|---|---|
| 8,836,608 | B2 | 9/2014 | Dandekar et al. | |
| 9,537,221 | B2 | 1/2017 | Maruyama et al. | |
| 9,831,557 | B2 | 11/2017 | Park et al. | |
| 10,833,414 | B2 * | 11/2020 | Kim | H01Q 9/0464 |
| 11,133,601 | B2 | 9/2021 | Yoon et al. | |
| 11,611,152 | B2 | 3/2023 | Zólomy et al. | |
| 2010/0277374 | A1 | 11/2010 | Ju et al. | |
| 2018/0191073 | A1 | 7/2018 | Celik | |
| 2019/0036226 | A1 | 1/2019 | Ding et al. | |
| 2022/0416436 | A1 | 12/2022 | Zólomy et al. | |
| 2023/0420869 | A1 | 12/2023 | Zólomy et al. | |

OTHER PUBLICATIONS

Krzysztofik et al., "Metamaterials in Application to Improve Antenna Parameters", Metamaterials and Metasurfaces, Chapter 4, pp. 63-85, Jan. 2019.

Mosallaei et al., "Antenna Miniaturization and Bandwidth Enhancement Using a Reactive Impedance Substrate", IEEE Transactions on Antennas and Propagation, vol. 52, No. 9, pp. 2403-2414, Sep. 2004.

Nasimuddin et al., "Metasurface-based Low Profile Broadband Circularly Polarized Antenna", Proc. of the 2017 IEEE Region 10 Conference (TENCON), Malaysia, Nov. 5-8, 2017, pp. 2378-2382.

Notice of Allowance mailed Jan. 10, 2023 in co-pending U.S. Appl. No. 17/356,853.

Office action mailed Sep. 7, 2022 in co-pending U.S. Appl. No. 17/356,853.

* cited by examiner

| ARRAY TYPE | SIZE (mm) | RETURN LOSS (dB) | | TOTAL RADIATION EFFICIENCY (dB) | | AZIMUTH ANGLE ESTIMATED ERROR (°) | | ELEVATION ANGLE ESTIMATED ERROR (°) | |
|---|---|---|---|---|---|---|---|---|---|
| | | 2.4GHz | 2.48GHz | MIN | MAX | TYPICAL | MAX | TYPICAL | MAX |
| PRESENT 4 X 4 ARRAY | 150 X 150 | -9.8 | -11.3 | -4 | -3 | 1 | 2 | <1 | 2 |
| CONVENTIONAL 4 X 4 ARRAY | 170 X 170 | -10.8 | -5.6 | -8.3 | -4.4 | 7 | 18 | 3 | 7 |

FIG. 9

METAMATERIAL ANTENNA ARRAY WITH ISOLATED ANTENNAS AND GROUND SKIRT ALONG THE PERIMETER

This application is a continuation-in-part of U.S. patent application Ser. No. 17/356,853, filed Jun. 24, 2021, the disclosure of which is incorporated by reference in its entirety.

This disclosure describes an antenna array, and more particularly to an antenna array that utilizes reactive impedance surface and guard rings around the antenna element and a guard skirt surrounding the perimeter of the antenna array.

BACKGROUND

The explosion of network connected devices has led to an increased use of certain wireless protocols. For example, simple wireless network devices are being implemented as temperature sensors, humidity sensors, pressure sensors, motion sensors, cameras, light sensors, dimmers, light sources, and other functions. Additionally, these wireless network devices have become smaller and smaller.

These wireless network devices are typically equipped with an embedded antenna. In certain embodiments, an antenna array may be required. For example, for Angle of Arrival and Angle (AoA) of Departure (AoD) calculations, an antenna array is necessary. In certain embodiments, the array may be a two dimensional array, such as an N×M array, where N and M are both greater than one. In other embodiments, the array may be a one dimensional array, such as N×1 or 1×M, where N and M are greater than one.

There are many design considerations that must be taken into account when designing an antenna array. For example, for accurate directional angle estimations in AoX (i.e. collective of AoA and AoD) solutions, well isolated radiator elements are required in the antenna array to reduce the crosstalk between them.

In certain embodiments, ground guard rings may not be used. In this configuration, the coupling between the antenna elements causes impedance, radiation pattern and radiation efficiency spreading, which depends on the location within the array. This complicates the array design and makes EM simulations and tuning take a significant amount of time.

To address this issue, massive ground rings may be disposed around each antenna element. However, a quite large gap is required between the antenna and the ground guard ring to avoid return loss (S11) and radiation pattern detuning and degradation of radiation gain and efficiency. These gaps together with the massive ground guard rings increase the overall array size.

In some wireless devices, the amount of space that may be allocated for the antenna array is limited. Thus, it may be difficult to provide the space necessary to incorporate the ground guard rings.

Therefore, it would be advantageous if there were an antenna array that had a small form factor, but also had very limited coupling between the antennas.

SUMMARY

An antenna array that utilizes ground guard rings and metamaterial structures is disclosed. In certain embodiments, the antenna array is constructed from a plurality of antenna unit cells, wherein each antenna unit cell is identical. The antenna unit cell comprises a top surface, that contains a patch antenna and a ground guard ring. A reactive impedance surface (RIS) layer is disposed beneath the top surface and contains the metamaterial structures. The metamaterial structures are configured to present an inductance to the patch antennas, thereby allowing the patch antennas to be smaller than would otherwise be possible. In some embodiments, the metamaterial structures comprise hollow square frames. An antenna array constructed using this antenna unit cell has less coupling than conventional antenna arrays, which results in better performance. Furthermore, this new antenna array also requires less space than conventional antenna arrays. A ground skirt surrounds the perimeter of the antenna array to improve the radiation pattern balance within the array.

According to one embodiment, an antenna unit cell is disclosed. The antenna unit cell comprises a top surface, comprising a patch antenna and a ground guard ring surrounding the patch antenna; a reactive impedance surface (RIS) layer disposed beneath the top surface, wherein the RIS layer comprises metamaterial structures; and a ground layer disposed beneath the RIS layer, wherein vias electrically connect the ground guard ring to the ground layer. In certain embodiments, the RIS layer is immediately adjacent to the top layer. In some embodiments, the ground layer is immediately adjacent to the RIS layer. In certain embodiments, the metamaterial structures comprise hollow square frames. In some embodiments, an integral number of metamaterial structures are disposed on the RIS layer in an area defined by the ground guard ring. In certain embodiments, the integral number is $N^2$, wherein N is an integer. In some embodiments, the antenna unit cell further comprises a RIS ground guard ring disposed on the RIS layer, vertically aligned with the ground guard ring and electrically connected to the vias and the ground layer.

According to another embodiment, an antenna array comprising a plurality of the antenna unit cells described above is disclosed. The antenna array may comprise N×M antenna unit cells, wherein at least one of N and M is greater than 1.

According to another embodiment, an antenna unit cell is disclosed. The antenna unit cell comprises a top surface, comprising a patch antenna and a ground guard ring surrounding the patch antenna; a reactive impedance surface (RIS) layer disposed beneath the top surface, wherein the RIS layer comprises metamaterial structures; a ground layer disposed beneath the RIS layer, wherein vias electrically connect the ground guard ring to the ground layer; and one or more unused metal layers disposed between the top surface and the RIS layer and/or between the RIS layer and the ground layer. In certain embodiments, the antenna unit cell comprises a RIS ground guard ring disposed on the RIS layer, vertically aligned with the ground guard ring and electrically connected to the vias and the ground layer. In some embodiments, the metamaterial structures comprise hollow square frames. In some embodiments, an integral number of metamaterial structures are disposed on the RIS layer in an area defined by the ground guard ring. In certain embodiments, the integral number is $N^2$, wherein N is an integer. In some embodiments, one or more unused metal layers are disposed between the top surface and the RIS layer and between the ground layer and the RIS layer. In certain embodiments, the antenna unit cell further comprises auxiliary ground guard rings disposed on at least one of the one of more unused metal layers, vertically aligned with the ground guard ring and electrically connected to the vias and the ground layer.

According to another embodiment, an antenna array comprising a plurality of the antenna unit cells described above is disclosed. The antenna array may comprise N×M antenna unit cells, wherein at least one of N and M is greater than 1.

According to another embodiment, an antenna array comprising a plurality of antenna unit cells described above is disclosed. Each antenna unit cell comprises a top surface, comprising a patch antenna and a ground guard ring surrounding the patch antenna; a reactive impedance surface (RIS) layer disposed beneath the top surface, wherein the RIS layer comprises metamaterial structures; and a ground layer disposed beneath the RIS layer, wherein vias electrically connect the ground guard ring to the ground layer. A ground skirt surrounds a perimeter of the antenna array on the top surface and vias electrically connect the ground skirt to the ground layer. In certain embodiments, the RIS layer is immediately adjacent to the top surface. In some embodiments, the ground layer is immediately adjacent to the RIS layer. In certain embodiments, the metamaterial structures comprise hollow square frames. In some embodiments, an integral number of metamaterial structures are disposed on the RIS layer in an area defined by the ground guard ring. In certain embodiments, the integral number is $N^2$, wherein N is an integer. In some embodiments, the antenna unit cell further comprises a RIS ground guard ring disposed on the RIS layer, vertically aligned with the ground guard ring and electrically connected to the vias and the ground layer. The antenna array may comprise N×M antenna unit cells, wherein at least one of N and M is greater than 1. In some embodiments, the antenna array comprises one or more unused metal layers disposed between the top surface and the RIS layer and/or between the RIS layer and the ground layer. In some embodiments, auxiliary ground guard rings are disposed on at least one of the one or more unused metal layers, vertically aligned with the ground guard ring and electrically connected to the vias and the ground layer. In certain embodiments, a second ground skirt is disposed on a different layer and vertically aligned with the ground skirt on the top surface.

According to another embodiment, an antenna array comprising a plurality of antenna unit cells described above is disclosed. Each antenna unit cell comprises a top surface, comprising a patch antenna and a ground guard ring surrounding the patch antenna; and a ground layer disposed beneath the top surface, wherein vias electrically connect the ground guard ring to the ground layer. A ground skirt surrounds a perimeter of the antenna array on the top surface and vias electrically connect the ground skirt to the ground layer. The antenna array may comprise N×M antenna unit cells, wherein at least one of N and M is greater than 1. In some embodiments, the antenna array comprises one or more unused metal layers disposed between the top surface and the ground layer. In some embodiments, auxiliary ground guard rings are disposed on at least one of the one or more unused metal layers, vertically aligned with the ground guard ring and electrically connected to the vias and the ground layer. In certain embodiments, a second ground skirt is disposed on a different layer and vertically aligned with the ground skirt on the top surface. In some embodiments, additional ground skirts are disposed on additional layers or on all layers.

BRIEF DESCRIPTION OF THE DRAWINGS

For a better understanding of the present disclosure, reference is made to the accompanying drawings, in which like elements are referenced with like numerals, and in which:

FIG. 9 shows a comparison of various parameters for the present antenna array and a conventional antenna array;

DETAILED DESCRIPTION

Figure 1:
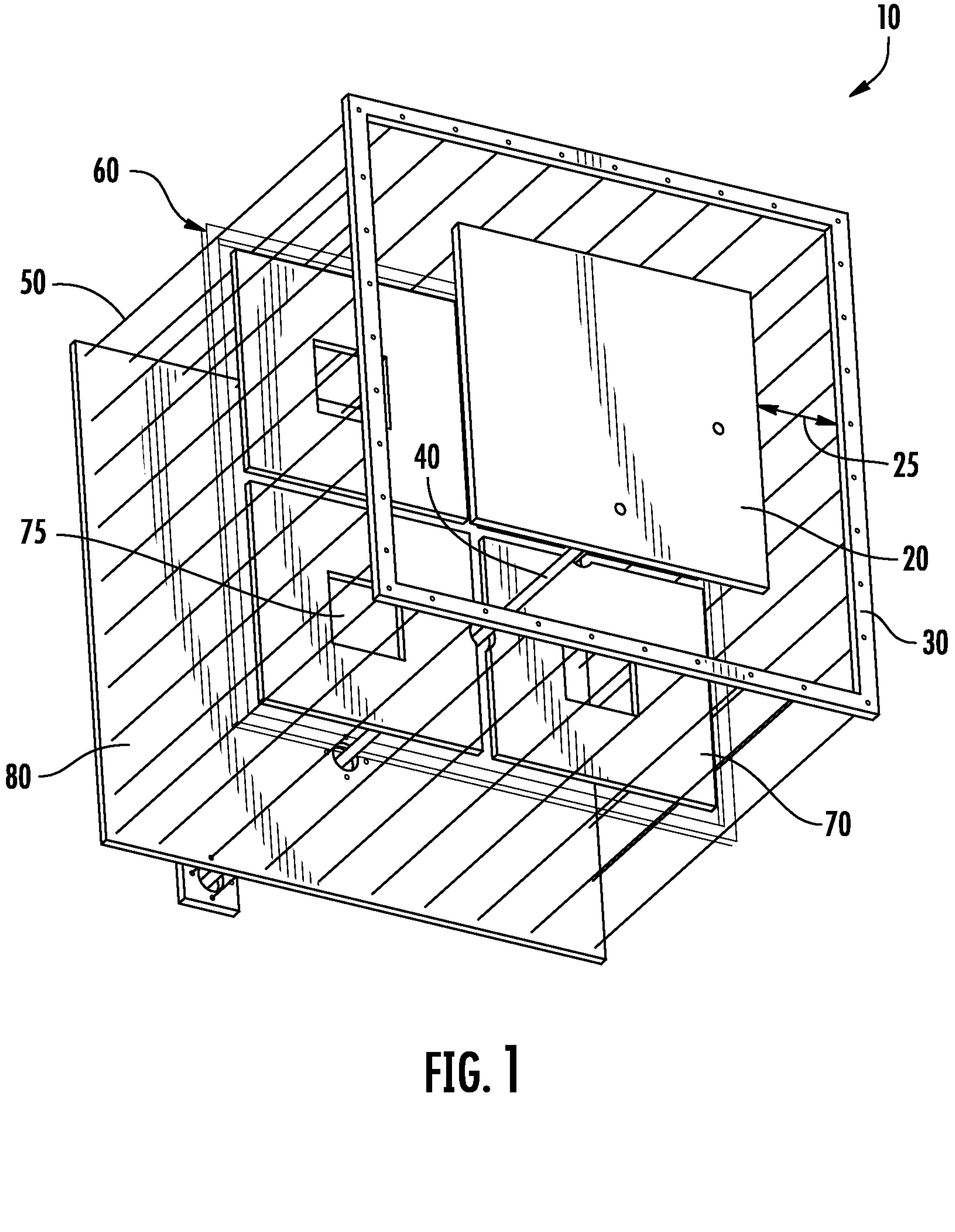
FIG. 1 shows an exploded view of the structure of one antenna unit cell in the antenna array.
Figure 2:
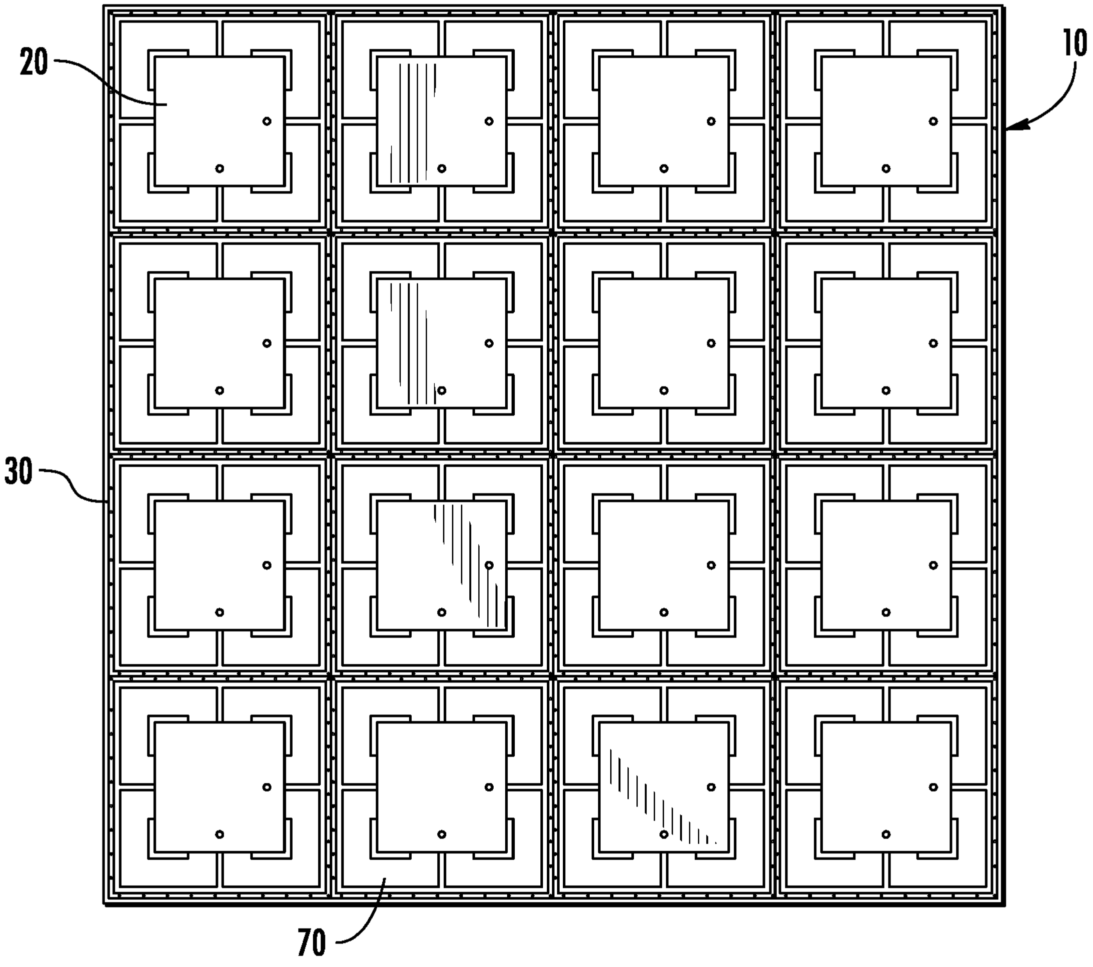
FIG. 2 shows a top view of the antenna array.

FIG. 1 shows an exploded view of one antenna unit cell 10 that may be part of an antenna array. FIG. 2 shows a top view of an antenna array utilizing a plurality of antenna unit cells 10.

Figure 3:
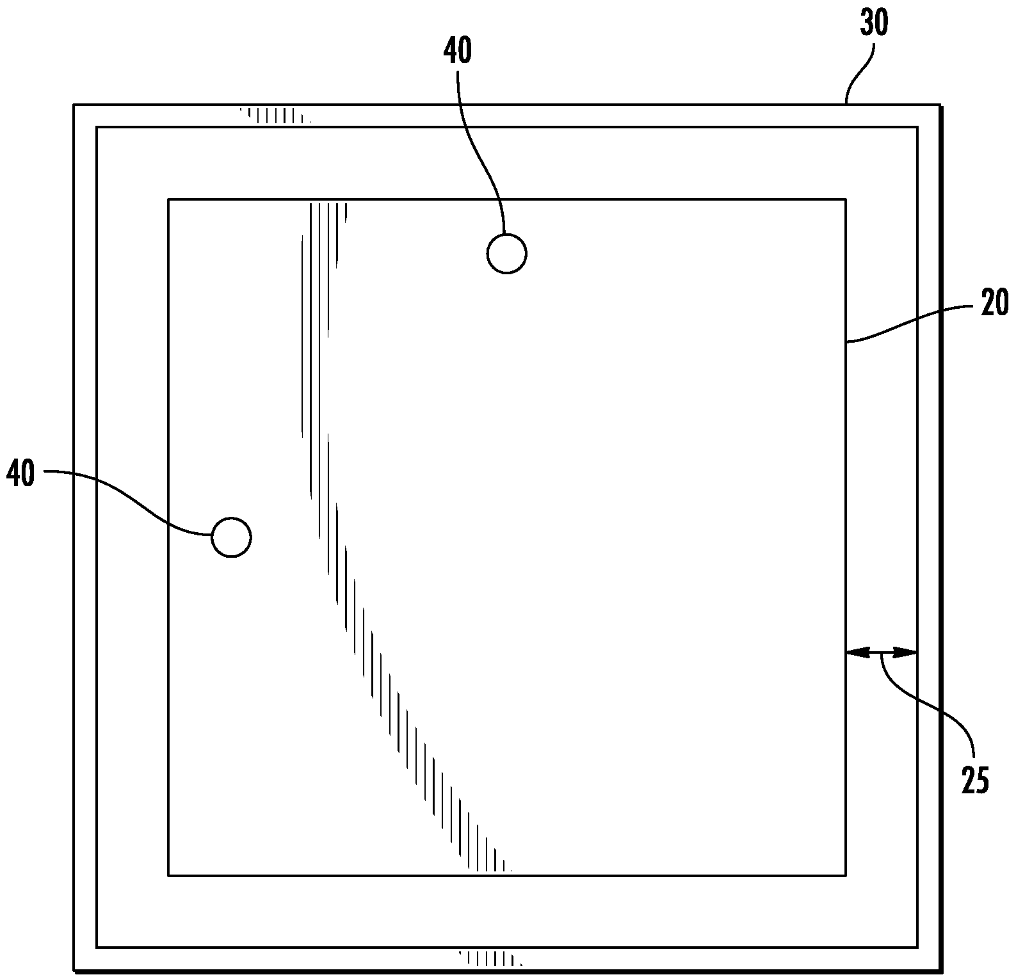
FIG. 3 shows a top view of the patch antenna and ground guard ring.
Figure 4:
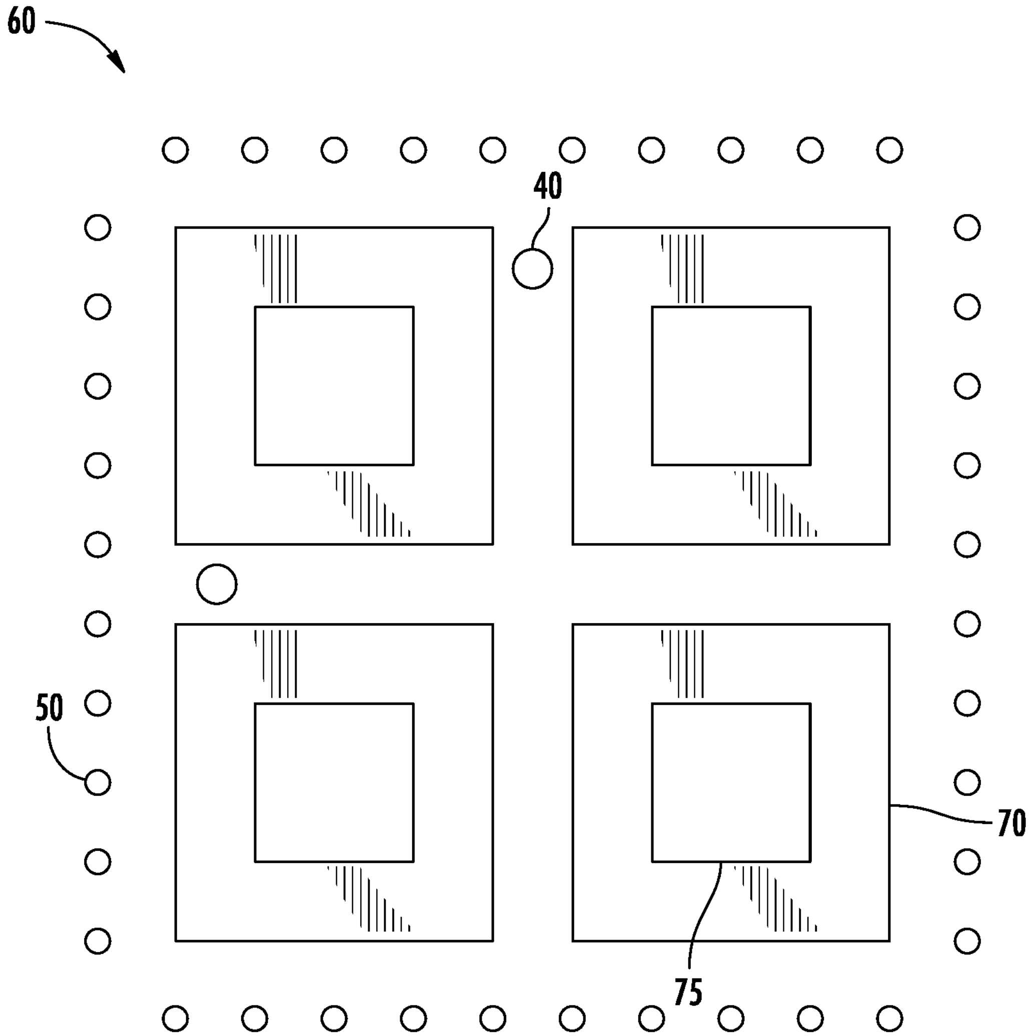
FIG. 4 shows a top view of the RIS layer and metamaterial structures.

As shown in FIG. 1, the structure of the antenna unit cell 10 utilizes three layers of a conventional printed circuit board. Other layers of the printed circuit board may be used to provide power planes, additional ground layers and signal layers. FIG. 3 is a top view of the top surface of the printed circuit board. FIG. 4 is a top view of the RIS layer 60.

The top surface of the printed circuit board is used for the patch antenna 20, while a lower layer is used for the ground layer 80. A reactive impedance surface (RIS) layer 60 is disposed beneath the top surface and above the ground layer 80. In certain embodiments, the RIS layer 60 is the layer immediately adjacent to the top surface. In some embodiments, the ground layer 80 is the layer immediately below the RIS layer 60, such that the top layer, the RIS layer 60 and the ground layer 80 are adjacent.

In other embodiments, there may be one or more intermediate layers between the RIS layer 60 and the ground layer 80, if thicker dielectric is required between them. In certain embodiments, no metal is disposed on these intermediate layers, except another instantiation of the top guard ring.

As stated above, in certain embodiments, a patch antenna 20 is disposed on the top layer of the printed circuit board. The patch antenna 20 may be square such that the patch antenna 20 may be used to receive and transmit both horizontally and vertically polarization signals. The size of the patch antenna 20 is typically defined by the desired resonant frequency, the thickness of the printed circuit board and the dielectric constant of the printed circuit board. In RIS antenna cell structures, additional tuning knobs may include the dielectric thickness between the patch antenna 20 and the RIS layer 60 and between the RIS layer 60 and the ground layer 80. Also, additional tuning knobs are the metamaterial structure frame size and width on the RIS layer.

The patch antenna 20 may be made of copper or another conductive material. The process of creating a plated area on a surface of a printed circuit board is well known.

As best seen in FIG. 3, in certain embodiments, the patch antenna 20 comprises two signal vias 40 which are used to electrically connect the patch antenna 20 to a signal layer or multiple signal layers. All signal layers are situated beneath the ground layer 80. In certain embodiments, the signal vias 40 pass through the ground layer 80 to a signal layer that is disposed beneath the ground layer 80. In certain embodiments, each signal via 40 may be disposed at or near the midpoint of the patch antenna 20 in one direction near an edge of the patch antenna 20. In this way, the patch antenna 20 may be used to transmit and receive horizontally and vertically polarized signals. In embodiments where only one polarization is required, only one signal via 40 may be used. In other embodiments, the one signal via 40 may be situated at the diagonal of the patch to generate circular polarized signal.

A ground guard ring 30 is disposed around the perimeter of the patch antenna 20. In certain embodiments, the ground guard ring 30 may be a hollow square frame, having a thickness of at least the half of the total thickness between the top layer and the ground layer 80. The inner dimension of the ground guard ring is larger than the outer dimension of the patch antenna 20, such that there may be a gap 25 separating the patch antenna 20 from the ground guard ring 30 on all sides. In certain embodiments, the gap 25 may be approximately three times the total thickness between the top layer and the ground layer 80 or higher.

As can be seen in FIG. 1, the ground guard ring 30 is electrically connected to the ground layer 80 using a plurality of vias 50, which are electrically conductive. These vias 50 extend from the top surface to the ground layer 80. In certain embodiments, the distance between adjacent vias 50 may be less than $\lambda/8$, where $\lambda$ is the wavelength of interest.

Beneath the top surface is the RIS layer 60, which is also shown in FIG. 4. The RIS layer 60 comprises a plurality of periodic metamaterial structures 70, shaped so as to realize a reactive impedance for incident electromagnetic waves. Metamaterial is the term given to any material engineered (typically by varying its shape) to provide electromagnetic properties that are not found in the base material. These metamaterial structures 70 may be many different shapes, including a Hilbert fractal inclusion of a second-, third-, or fourth-order, a rectangular spiral, a square spiral, a rectangular ring, or a split ring resonator.

In one particular embodiment, the metamaterial structure 70 may be a hollow square frame, having an outer dimension and an inner dimension that defines a hollow interior portion 75. The width of the frame, defined as one half of the difference between the outer dimension and the inner dimension, may be adjusted to tune the resonant frequency of the metamaterial structure 70. Again, the dimensions of the metamaterial structure 70 may depend on the resonant frequency, the dielectric constant of the printed circuit board, the thickness of the dielectric between the RIS layer 60 and ground layer 80, the thickness of the applied metal, the spacing between the consecutive metamaterial structures and width of the frame of the metamaterial structures 70.

In certain embodiments, the metamaterial structures 70 are sized such that an integral number of these structures may be arranged in the area defined by the ground guard ring 30 on the top surface of the printed circuit board. In certain embodiments, this integral number may be $N^2$, where N is an integer. In other embodiments, this integral number may be N×M, where N and M are integers. In FIG. 1, it can be seen that four metamaterial structures 70 are disposed in the area defined by the ground guard ring 30 on the top surface. However, the disclosure is not limited to this embodiment. Further, as shown in FIG. 4, the vias 50 that connect the ground guard ring 30 to the ground layer 80 may be seen around the perimeter of the metamaterial structures. Additionally, the signal vias 40 are also shown. Note that if N is even, the signal vias 40 may pass between two adjacent metamaterial structures 70.

A top view of the antenna array is shown in FIG. 2. In this figure, there are 16 antenna unit cells 10, arranged as a 4×4 array. Note that the ground guard ring 30 surrounds each patch antenna 20. Further, note that the RIS layer 60 is aligned with the top surface, such that the configuration of the RIS layer 60 in each antenna unit cell 10 is identical. Of course, the antenna array may have an arbitrary number of antenna unit cells, and is not limited to this embodiment. For example, the antenna array may comprise N×M antenna unit cells 10, where at least one of N and M is greater than 1.

Figure 5A:
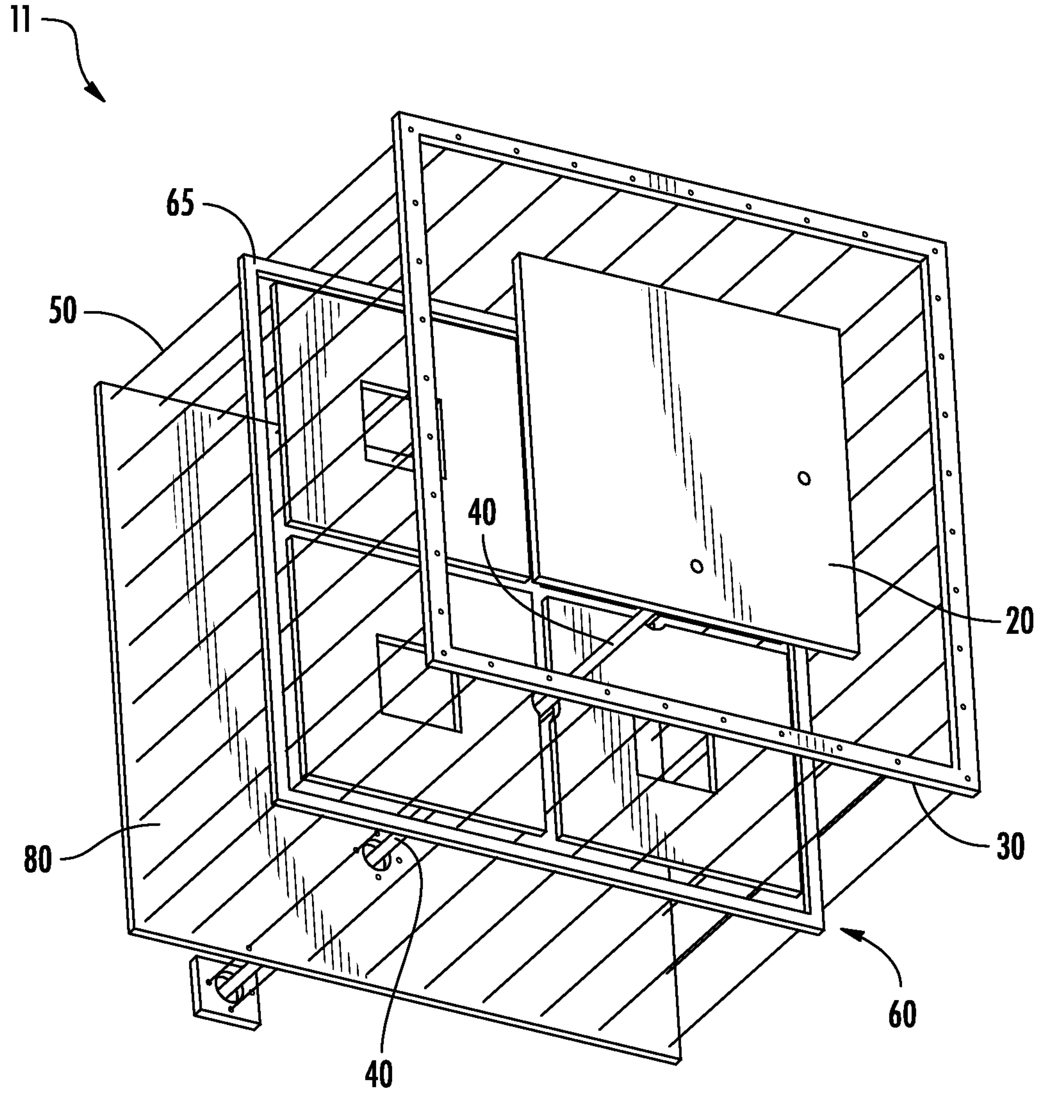
FIG. 5A shows an exploded view of the structure of one antenna unit cell according to another embodiment.
Figure 6:
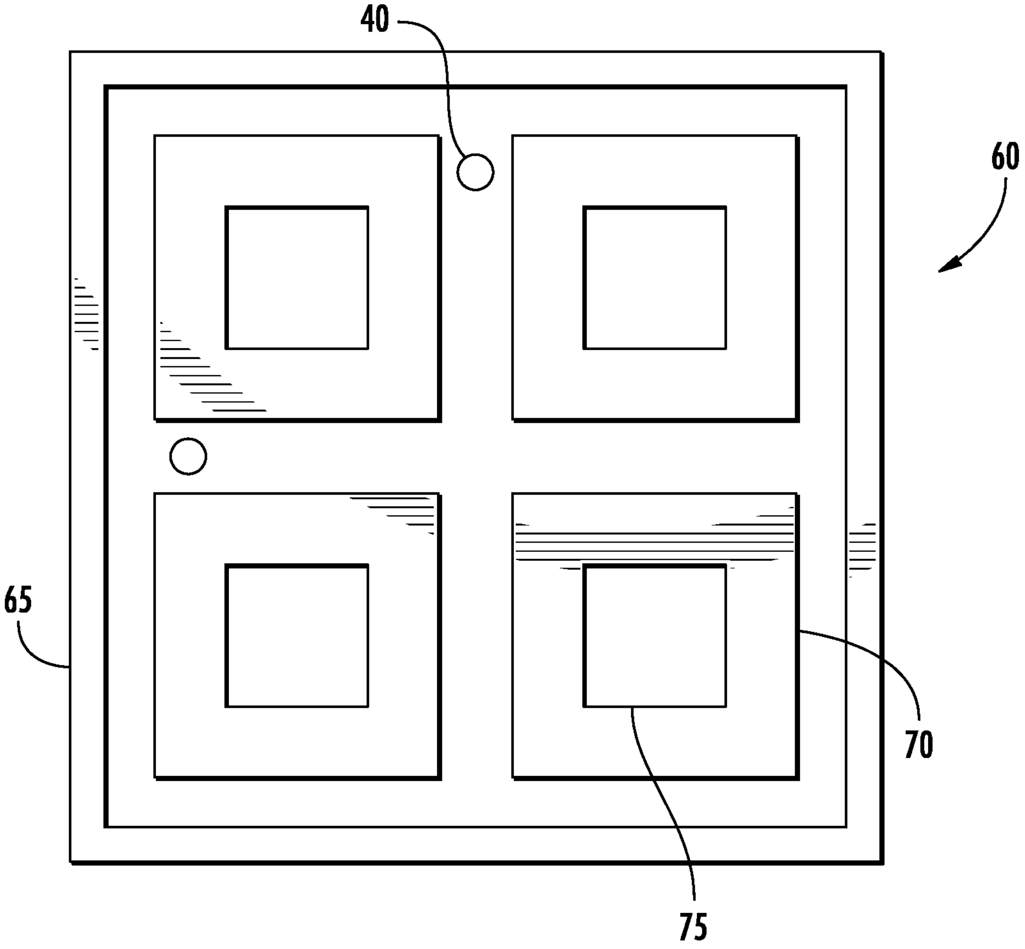
FIG. 6 shows a top view of the RIS layer and metamaterial structures for the antenna unit cell shown in FIG. 5A.

FIG. 5A shows a variation of the antenna unit cell 11 that is shown in FIG. 1. In this variation, there is a RIS ground guard ring 65 surrounding the metamaterial structures 70 on the RIS layer 60 to further improve the isolation. This RIS ground guard ring 65 may have the same dimensions as the ground guard ring 30 on the top surface and may be vertically aligned with that ring. This is also shown in FIG. 6. Note that in this embodiment, the vias 50 connect the ground guard ring 30 to the RIS ground guard ring 65 and to the ground layer 80. The rest of the antenna unit cell 11 is as described above. In this embodiment, the gap between the metamaterial structures 70 and the RIS ground guard ring 65 should be at least the dielectric thickness between the RIS layer 60 and the ground layer 80 to avoid any effect on the RIS resonant frequency. If the gap is smaller, then it shifts the RIS resonant frequency down, but also degrades the radiation efficiency.

Figure 5B:
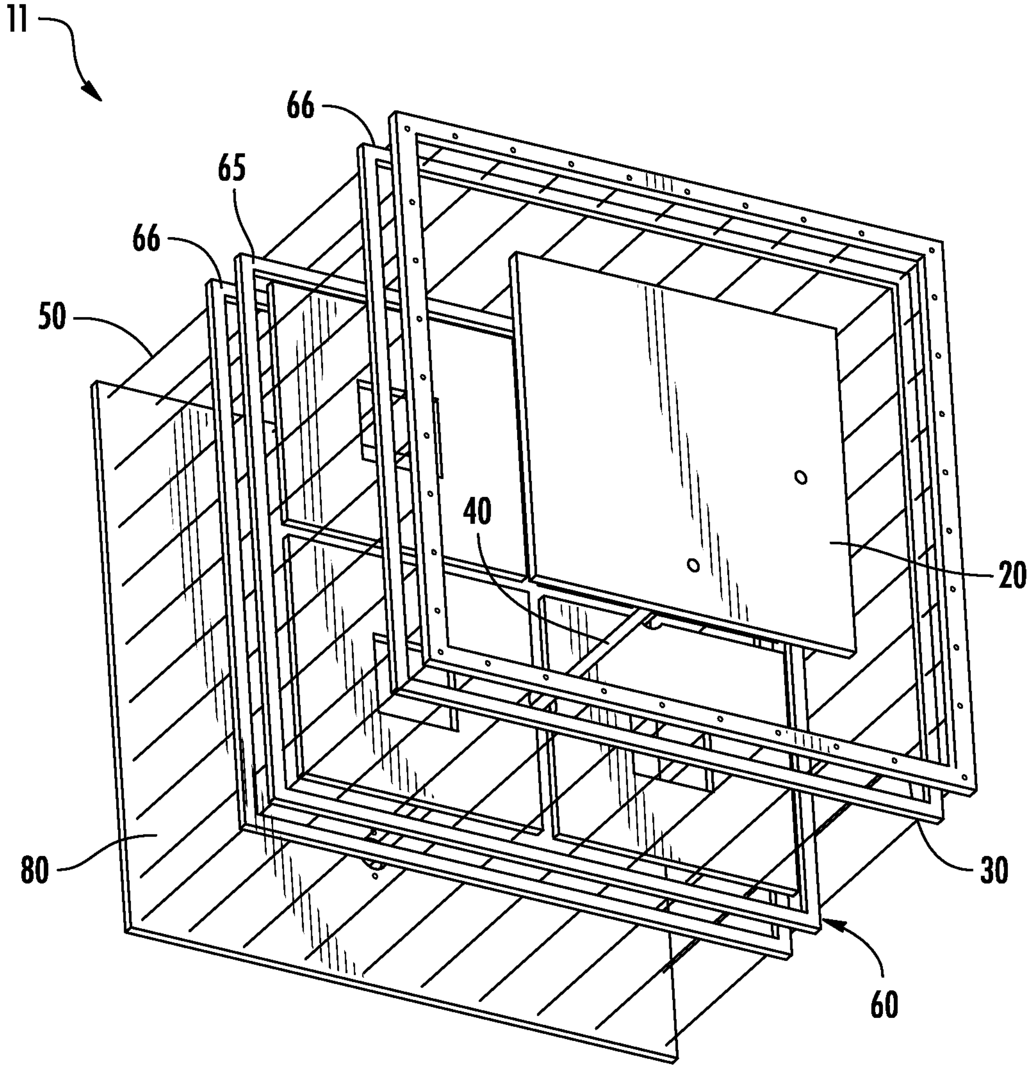
FIG. 5B shows an exploded view of the structure of one antenna unit cell according to a third embodiment.

FIG. 5B shows another variation of the antenna unit cell 11 that is shown in FIG. 1. In this variation, a 6 layer PCB is used to allow more flexibility in the design and some of the metal layers left unused beneath the antennas for better radiation. Of course, more layers may be used. Thus, practically, some of the dielectric layers are unified by this way to form a thicker dielectric layer. Optionally, auxiliary ground guard rings 66 can be applied in these unused metal layers as well. That is advantageous for two reasons. First, these auxiliary ground guard rings 66 further improve the isolation between antenna unit cells 11. Second, these additional auxiliary ground guard rings 66 makes the PCB manufacturing more balanced from PCB tension point of view: as leaving metal layers fully unused may cause metal unbalance and thus, unwanted mechanical tensions in the PCB. In FIG. 5B, the unused metal layers are disposed on opposite sides of the RIS layer 60. However, the unused layers may be disposed in other locations. For example, the unused metal layers may only be disposed between the top surface and the RIS layer 60 or only between the RIS layer 60 and the ground layer 80.

Thus, the present disclosure describes an antenna unit cell that utilizes three layers of a printed circuit board. The top layer comprises a patch antenna 20 and a ground guard ring 30 that surrounds the patch antenna 20. Beneath the top layer comprises a RIS layer 60 that comprises an integral number of metamaterial structures 70 that fit within the area defined by the ground guard ring 30 on the top layer. In some embodiments, the RIS layer 60 also includes a RIS ground guard ring 65. Below the RIS layer 60 is the ground layer.

Thus, in one embodiment, the present disclosure describes an antenna array that a utilizes a plurality of antennas wherein each antenna includes a ground guard ring and metamaterial structures disposed on a RIS layer.

Additionally, in another embodiment, the present disclosure describes an antenna unit cell, which is modular in design. In other words, an antenna array may be constructed simply by arranging the desired number of antenna unit cells 10 next to one another in one or two perpendicular directions. The metamaterial structures 70 are dimensioned such that an integral number of structures are contained in the area defined by the ground guard ring 30. In this way, the antenna unit cell is identical for each antenna in the antenna array.

Importantly, the RIS layer 60 has the effect of presenting a larger inductance. Therefore, a smaller patch antenna, having lower capacitance, can achieve the same resonant frequency as a larger patch antenna that does not utilize the RIS layer 60.

In one particular embodiment, the antenna array may be designed to transmit and receive radio frequency signals having a nominal frequency of about 2.45 GHz. This is the frequency used for many wireless protocols, including Bluetooth, WiFi, Zigbee, Thread and other 802.15.4 protocols.

In these embodiments, the patch antenna 20 may be a square having a dimension of 22×22 mm. Further, in these embodiments, the inner dimension of the metamaterial structure 70 may be 4×4 mm, while the outer dimension may be 16×16 mm. In certain embodiments, each of the metamaterial structures 70 may be dimensioned such that a side of the square structure is close to λ/4. This dimension may vary based on the distance between adjacent metamaterial structures and also on the cumulative dielectric thickness between the RIS layer 60 and the ground layer 80.

In some embodiments, the antenna array may be used in conjunction with an Angle of Arrival or Angle of Departure (collective, AoX) algorithm to determine a location of another wireless device. Various algorithms exist to determine the AoX of another device. For example, the MUSIC algorithm creates a one or two dimensional graph, depending on the configuration of the antenna array, where each peak on the graph represents a direction of arrival for an incoming signal. This one or two dimensional graph may be referred to as a pseudo-spectrum. The MUSIC algorithm calculates a value for each point on the graph.

In addition to the MUSIC algorithm, other algorithms may also be used. For example, the Minimum Variance Distortionless Response (MVDR) beamformer algorithm (also referred to as Capon's beamformer), the Bartlett beamformer algorithm, and variations of the MUSIC algorithm may also be used. In each of these, the algorithms use different mathematical formulas to calculate the angle of arrival.

This system and method have many advantages.

The use of a RIS layer 60, in conjunction with ground guard rings results in a smaller antenna array with improved performance.

First, with respect to size, a conventional antenna array, optimized for operation at 2.45 GHz, may utilize patch antennas that are each 27.50 mm squares, and are spaced apart by 12.5 mm. Thus, a conventional 4×4 antenna array may consume an area of about 170 mm×170 mm. In contrast, each of the present antenna unit cells, operating at the same frequency, has an area of 37.5 mm×37.5 mm. Thus, a 4×4 antenna array only occupies an area of about 150 mm×150 mm. Thus, the new antenna array consumes less than 80% of the area of a conventional antenna array.

Figure 7:
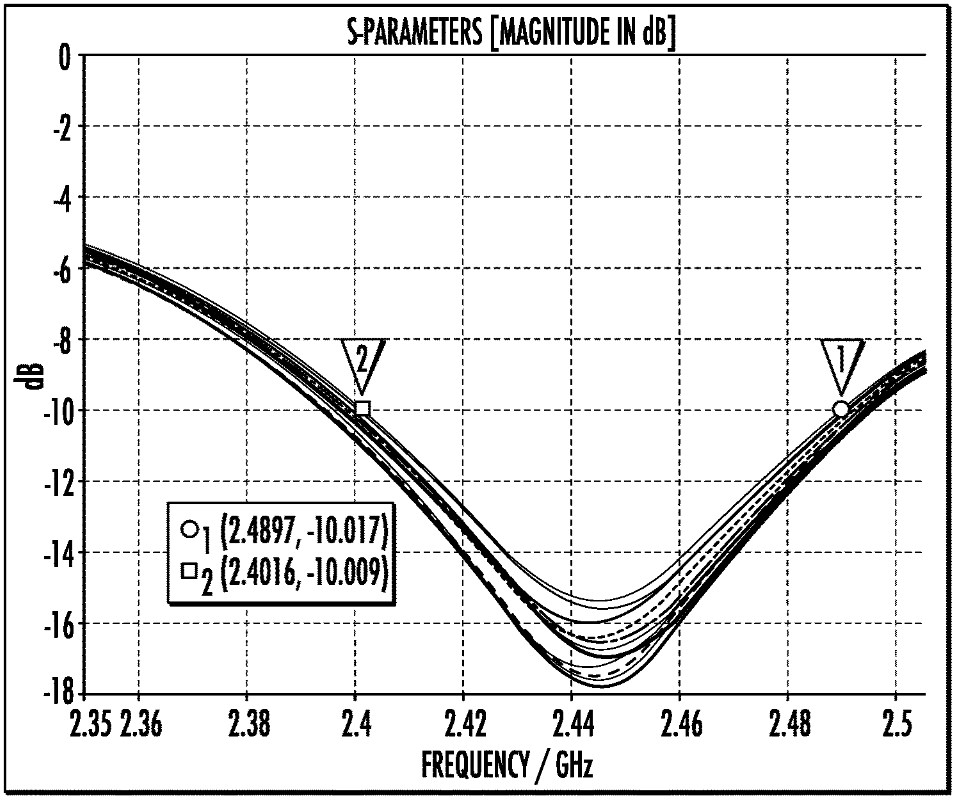
FIG. 7 is a graph showing the return loss of each antenna in a 4×4 antenna array.
Figure 8:
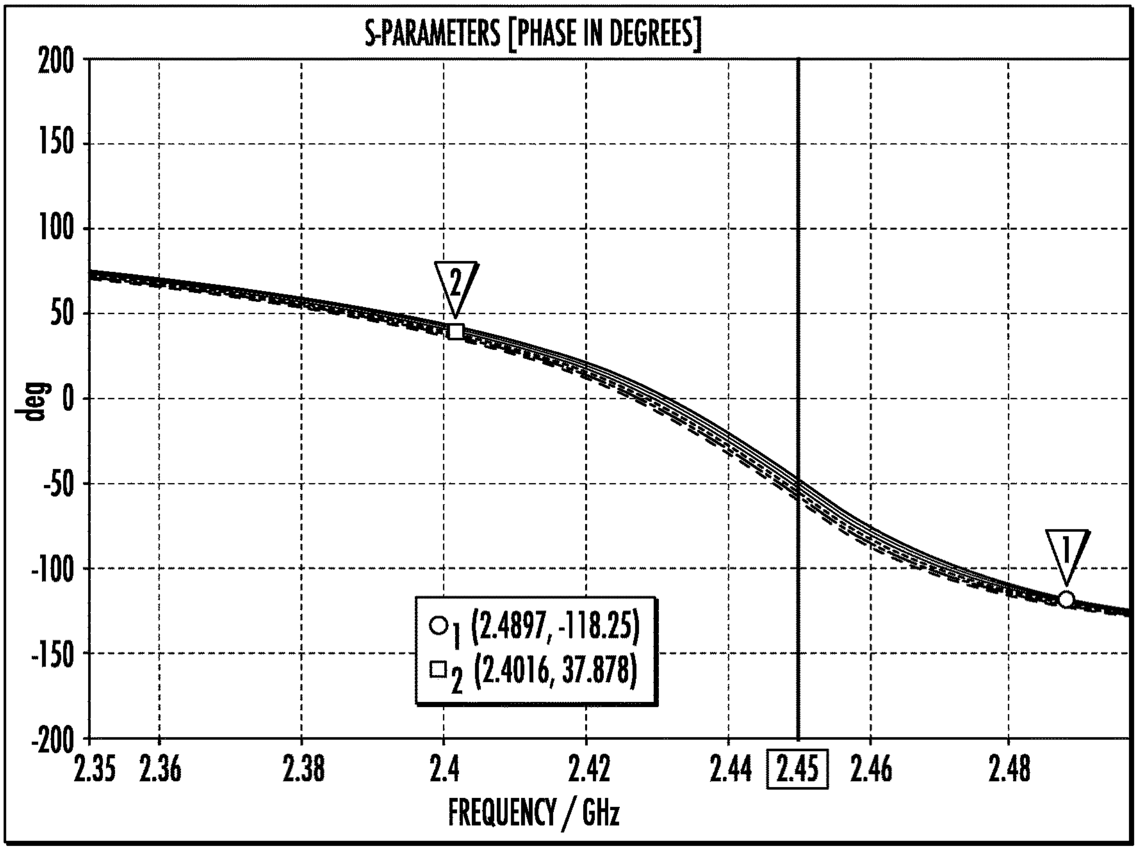
FIG. 8 shows the phase for each antenna in a 4×4 antenna array applying separate vertical and horizontal polarized signals.

Second, with respect to performance, as shown in FIG. 7, in one embodiment that utilizes a 4×4 antenna array configured to operate at 2.45 GHz, all of the antennas in the array have a return loss of less than −10 dB over the frequency range from 2.4 GHz to 2.49 GHz. Thus, the bandwidth of the antenna array is wider than that of a conventional antenna array, by as much as 30-50%. Further, as shown in FIG. 8, due to the reduced coupling, the reflection phase difference between the different antennas at 2.45 GHz is about 10°. Further, in another test, it was found that the total radiation efficiencies of the various antennas in the array was within about 1 dB of one another. This is roughly 1 dB better than can be achieved with a conventional antenna array. In this disclosure, total radiation efficiency ($E_T$) is defined as radiation efficiency ($E_R$), multiplied by the impedance mismatch loss ($M_L$). Further, radiation efficiency is defined as the radiated power ($P_{RAD}$) divided by the input power ($P_{INPUT}$); in other words:

$$E_R = P_{RAD}/P_{INPUT}.$$

Third, as described above, in certain embodiments, the antenna array is used in conjunction with an AoX algorithm. In each of these algorithms, the algorithm utilizes phase information from each of the plurality of antennas in the antenna array. Because the phase error of each antenna is reduced due to the ground guard rings, the results of an AoX calculation are much improved.

FIG. 9 illustrates all of the above benefits. As can be seen, the return loss at both band edges is about −10 dB for the present antenna, while the conventional array achieves less than −6 dB at the higher frequency. Furthermore, the variation in total radiation efficiency is much reduced with the present antenna, due to less spreading because of improved isolation between antennas. Lastly, the AoX estimations are much improved by the present antenna due to the reduced error because of better antenna unit cell isolation.

Additionally, the improved isolation between adjacent antenna unit cells simplifies the design and simulation of the antenna array. With this well isolated unit cell building block concept the return loss, the bandwidth, the radiation pattern and the gain and efficiency spreading are minimized. Further, these RF properties are stable everywhere within the antenna array. Consequently, it is sufficient to tune and properly design only the unit cell building block and not the whole array. This saves simulation process time and makes the array design much simpler.

Figure 10:
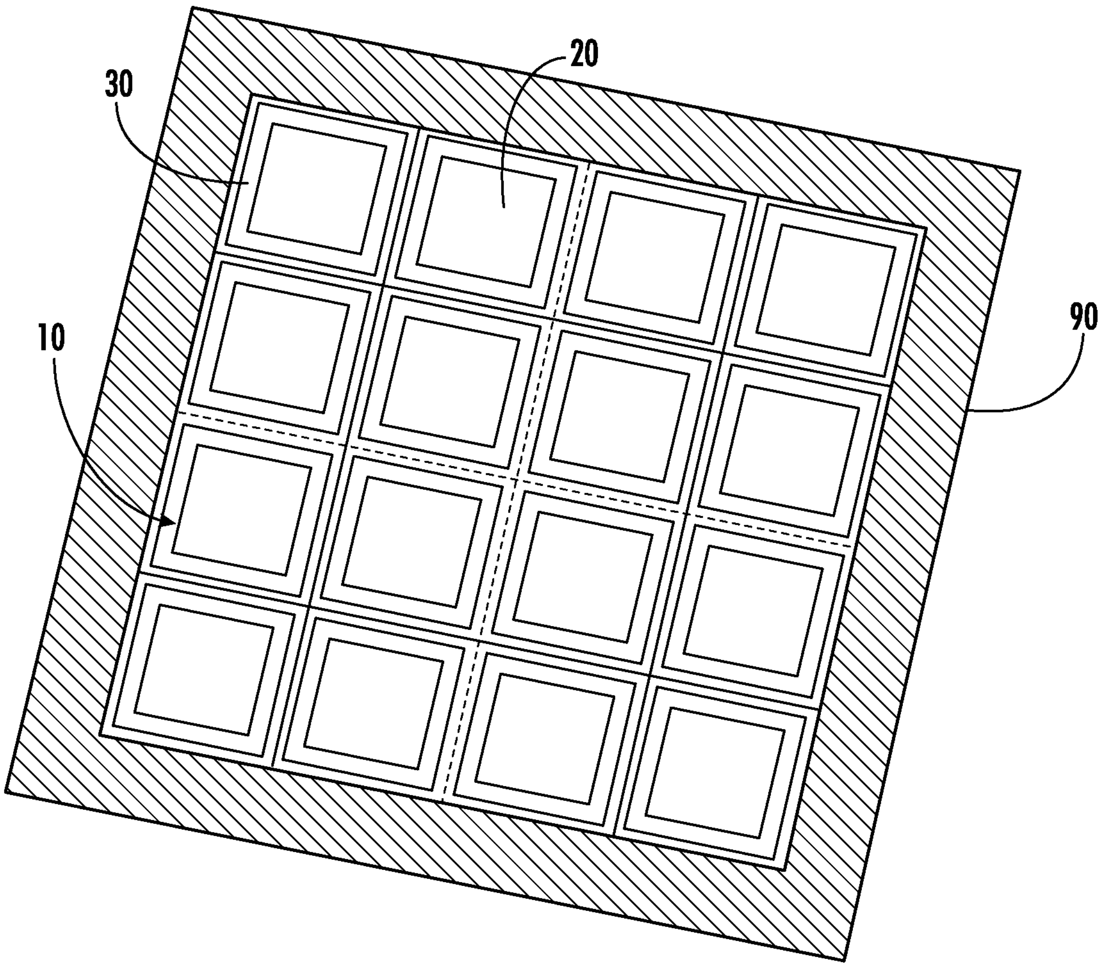
FIG. 10 shows an antenna array with a ground skirt according to one embodiment.

In certain embodiments, it may be beneficial to include a ground skirt on the top layer of the printed circuit board. This is shown in FIG. 10. FIG. 10 shows a top view of an antenna array utilizing a plurality of antenna unit cells 10. In this embodiment, the array is surrounded by a ground skirt 90 on the top layer. The ground skirt 90 may surround the perimeter of the array and have the same shape as the perimeter of the array. For example, in FIG. 10, the array is square, comprising 4 antenna unit cells in each direction. Thus, in this embodiment, the ground skirt 90 may be a hollow square. The term "hollow square" refers to a shape where the outer perimeter of the shape is a square. Further, the perimeter of the hollow interior portion of the square is also a square. Thus, the ground skirt 90 has an outer dimension and an inner dimension that defines a hollow interior portion. The width of the skirt, defined as one half of the difference between the outer dimension and the inner dimension, may be 10 mm, although other dimensions may be used. Thicker skirt widths may result in better phase pattern uniformity between the different unit cells. However, a thicker skirt thickness also increases the overall antenna array size.

The ground skirt 90 is electrically connected to the ground layer 80 using a plurality of vias, similar to the vias 50 used to connect the ground guard ring 30 to the ground layer 80.

FIG. 11A-11D shows the performance improvement that may be achieved through the use of the ground skirt 90 of FIG. 10. FIGS. 11A-11D show the phase patterns for three different antenna unit cells, an edge antenna unit cell, a corner antenna unit cell and an interior antenna unit cell. Note that the topology of each type of the antenna unit cells is different. The interior antenna unit cell is surrounded by other antenna unit cells on all sides. An edge antenna unit cell is surrounded by other antenna unit cells on three sides, while a corner antenna unit cell is only surrounded by other antenna unit cells on two sides.

To demonstrate the effect of the ground skirt 90, several simulations were performed. In these simulations, the coordinate system is as shown in FIG. 12. The antenna unit cells labelled Center, Edge and Corner are used in the simulations shown in FIGS. 11A-11D. In this simulation, all ports are situated at the bottom layer and the patches at the top layer are fed by through-hole vias. All ports receive both the θ and the φ polarized signals so the total number of phase radiation characteristics is double of the number of ports. In other words, in the case of a 4×4 dual feed array, there are 32 ports and 64 phase radiation characteristics.

It was found that, without the ground skirt 90, in case of the θ polarized characteristics, the main direction of radiation is in parallel with the port polarizations and there are nulls to the orthogonal directions. In case of the φ polarized signals, the main direction of radiations are orthogonal to the port polarizations.

Further, it was found that the φ polarized radiated phase characteristics are significantly deteriorated and become more asymmetric, especially at low PCB elevations (i.e. at higher θ degrees), where the signal polarization is nearly parallel to the PCB plane.

Figure 11A:
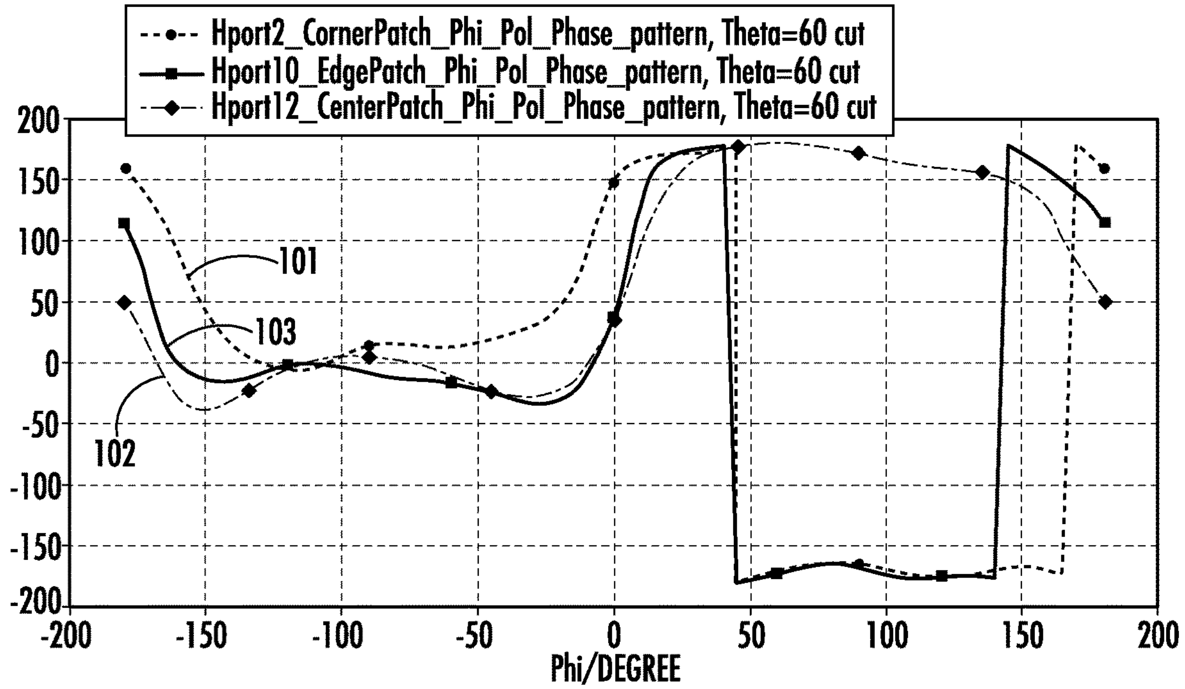
FIGS. 11A-11D show a comparison of the radiation patterns for an antenna array and the antenna array with the ground skirt.
Figure 12:
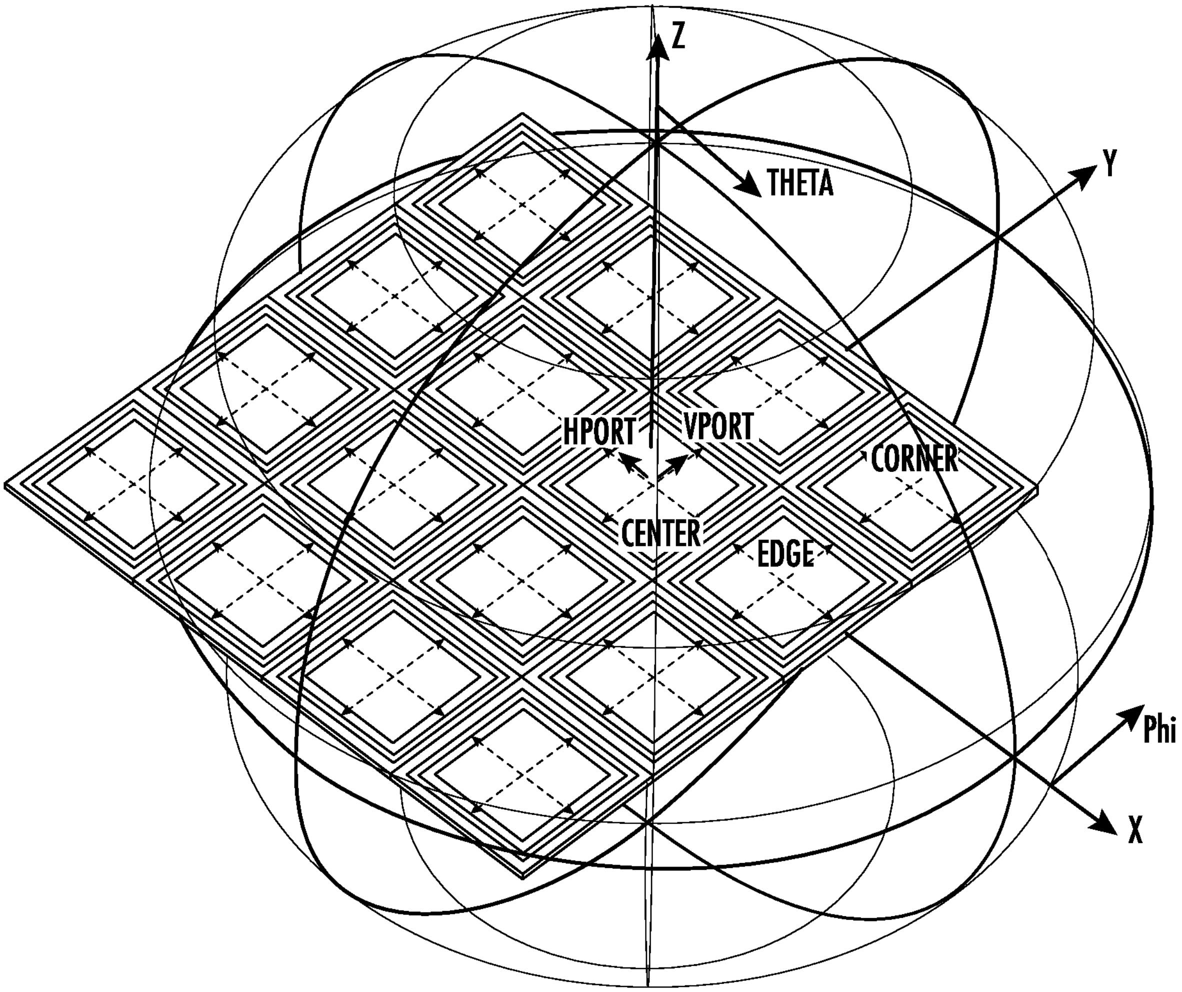
FIG. 12 shows the coordinate system used for FIGS. 11A-11D.

FIG. 11A compares the most sensitive H port φ polarized patterns of a corner antenna unit cell 101, a center antenna unit cell 102 and an edge antenna unit cell 103. FIG. 11A shows the θ=60° cuts of these patterns. Here the azimuth (φ) is running. As it can be seen, there are significant phase pattern differences between the corner antenna unit cell 101, the center antenna unit cell 102 and the edge antenna unit cell 103. The uniformity is degraded, which in turn degrades the AoX estimation accuracy. Please note that the sudden jumps seen in the phase curve are due to the shown phase values being limited to the −180°-180° region.

Figure 11B:
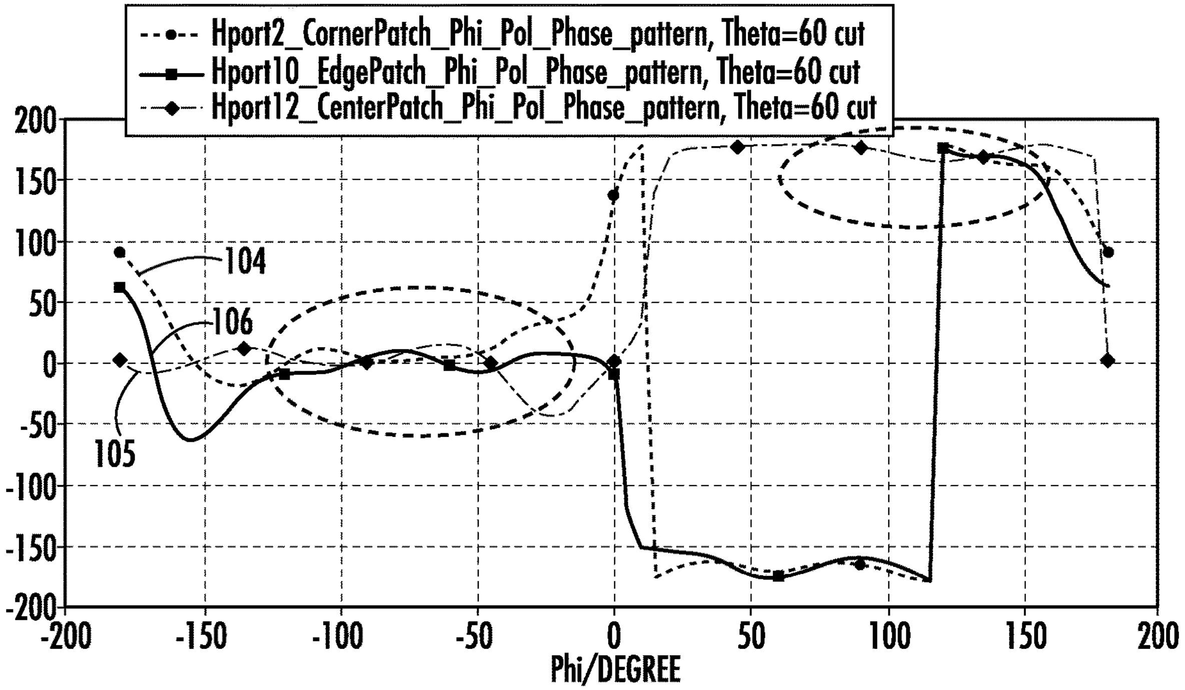

Due to the improved isolation provided by the ground skirt 90, their φ polarized phase radiation characteristics become less asymmetric and thus, be closer to that of a center patch. This is demonstrated in FIG. 11B, which shows most sensitive H port φ polarized patterns of a corner antenna unit cell 104, a center antenna unit cell 105 and an edge antenna unit cell 106 of an antenna array with the ground skirt 90. The azimuth phase regions where improvement can be observed in the uniformity between FIGS. 11A and 11B are highlighted by dashed ellipses. Thus, FIGS. 11A-B show a comparison of the H port φ polarized patterns of three antenna unit cells with and without the ground skirt 90.

Figure 11C:
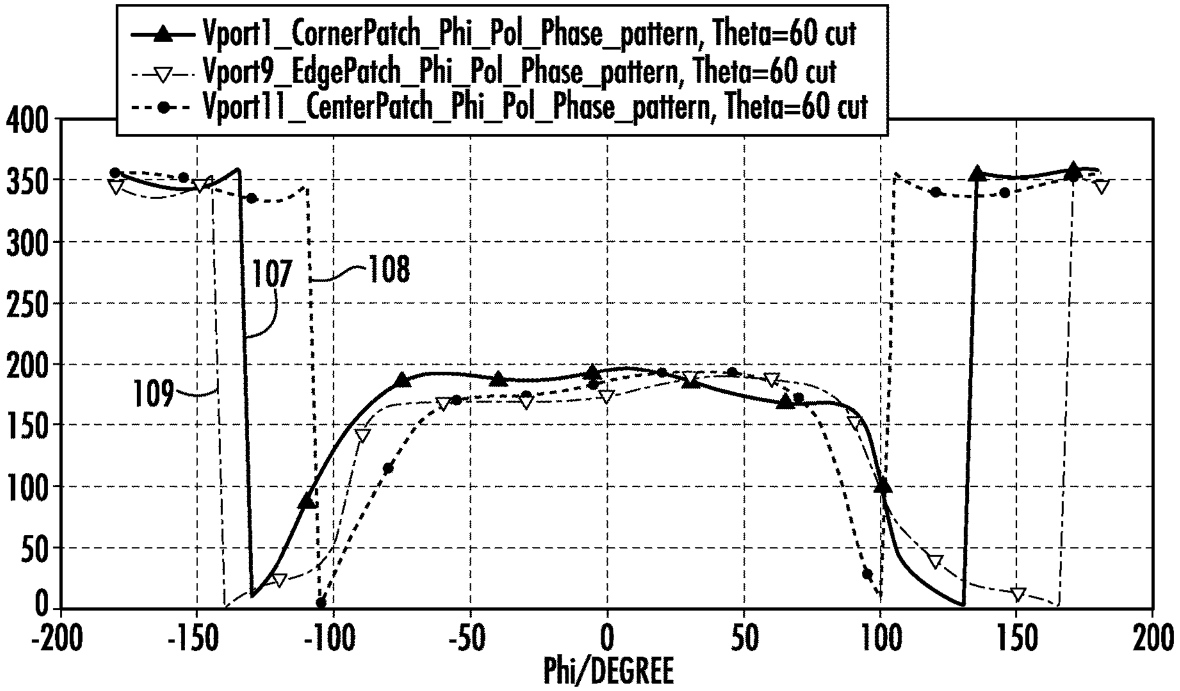
Figure 11D:
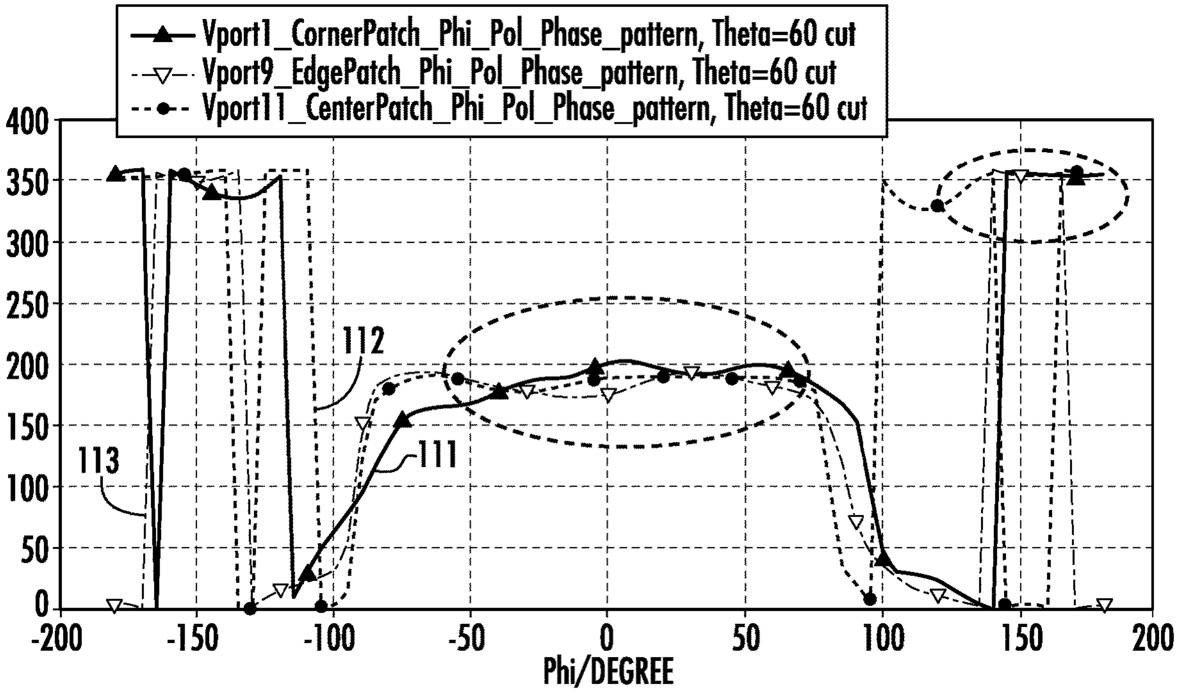

FIG. 11C compares the sensitive V port φ polarized patterns of a corner antenna unit cell 107, a center antenna unit cell 108 and an edge antenna unit cell 109. FIG. 11C shows the θ=60° cuts of these patterns. Again, due to the improved isolation provided by the ground skirt 90, their φ polarized phase radiation characteristics become less asymmetric and thus, become closer to that of a center patch. This is demonstrated in FIG. 11D, which shows the sensitive V port φ polarized patterns of a corner antenna unit cell 111, a center antenna unit cell 112 and an edge antenna unit cell 113 of an antenna array with the ground skirt 90. The azimuth phase regions where improvement can be observed in the uniformity between FIGS. 11C and 11D are highlighted by dashed ellipses. Thus, FIGS. 11C-D show a comparison of the V port φ polarized patterns of three antenna unit cells with and without the ground skirt 90.

Thus, the inclusion of the ground skirt 90 may improve phase uniformity for different unit cells. While the ground skirt 90 is shown on the top layer, it is understood that the disclosure is not limited to this embodiment. For example, a second ground skirt may be disposed directly below the ground skirt on the RIS layer 60, or on another intermediate layer, such that the ground skirts are vertically aligned. When multiple ground skirts are used, they may be connected to one another and to the ground layer 80 using vias, similar to the vias 50 used to connect the ground guard rings 30 and RIS ground guard ring 65.

It is noted that the ground skirt 90 may be utilized with other configurations. For example, the ground skirt 90 may be used with an array of antenna unit cells, where each antenna unit cell comprises a patch antenna on the top surface and a ground guard ring surrounding the path antenna. In other words, the antenna unit cell may not include metamaterial structures.

Further, while the figures show the array as being arranged as a rectangle or square, other configurations are also possible. For example, the antenna unit cells may be configured as a pentagon, hexagon, octagon or other shape.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An antenna array, comprising:

a plurality of antenna unit cells, wherein each antenna unit cell comprises:
- a top surface, comprising a patch antenna and a ground guard ring surrounding the patch antenna;
- a reactive impedance surface (RIS) layer disposed beneath the top surface, wherein the RIS layer comprises metamaterial structures; and
- a ground layer disposed beneath the RIS layer, wherein vias electrically connect the ground guard ring to the ground layer;

wherein a ground skirt surrounds a perimeter of the antenna array on the top surface, and wherein additional vias electrically connect the ground skirt to the ground layer.

2. The antenna array of claim 1, wherein the RIS layer is immediately adjacent to the top surface.

3. The antenna array of claim 2, wherein the ground layer is immediately adjacent to the RIS layer.

4. The antenna array of claim 1, wherein the metamaterial structures comprise hollow square frames.

5. The antenna array of claim 1, wherein an integral number of metamaterial structures are disposed on the RIS layer in an area defined by the ground guard ring.

6. The antenna array of claim 5, wherein the integral number is $N^2$, wherein N is an integer.

7. The antenna array of claim 1, further comprising a RIS ground guard ring disposed on the RIS layer, vertically aligned with the ground guard ring and electrically connected to the vias and the ground layer.

8. The antenna array of claim 1, wherein the plurality of antenna unit cells comprises N×M antenna unit cells, wherein N and M are integers and at least one of N and M is greater than 1.

9. The antenna array of claim 1, further comprising one or more unused metal layers disposed between the top surface and the RIS layer and/or between the RIS layer and the ground layer.

10. The antenna array of claim 9, further comprising auxiliary ground guard rings disposed on at least one of the one or more unused metal layers, vertically aligned with the ground guard ring and electrically connected to the vias and the ground layer.

11. The antenna array of claim 1, further comprising a second ground skirt disposed on a different layer and vertically aligned with the ground skirt on the top surface.

12. An antenna array, comprising:

a plurality of antenna unit cells, wherein each antenna unit cell comprises:

a top surface, comprising a patch antenna and a ground guard ring surrounding the patch antenna; and a ground layer disposed beneath the top surface, wherein vias electrically connect the ground guard ring to the ground layer;

wherein a ground skirt surrounds a perimeter of the antenna array on the top surface, and wherein additional vias electrically connect the ground skirt to the ground layer.

13. The antenna array of claim 12, wherein the plurality of antenna unit cells comprises N×M antenna unit cells, wherein N and M are integers and at least one of N and M is greater than 1.

14. The antenna array of claim 12, further comprising one or more unused metal layers disposed between the top surface and the ground layer.

15. The antenna array of claim 14, further comprising auxiliary ground guard rings disposed on at least one of the one or more unused metal layers, vertically aligned with the ground guard ring and electrically connected to the vias and the ground layer.

16. The antenna array of claim 12, further comprising a second ground skirt disposed on a different layer and vertically aligned with the ground skirt on the top surface and electrically connected to the vias and the ground layer.

* * * * *